Patented May 15, 1951

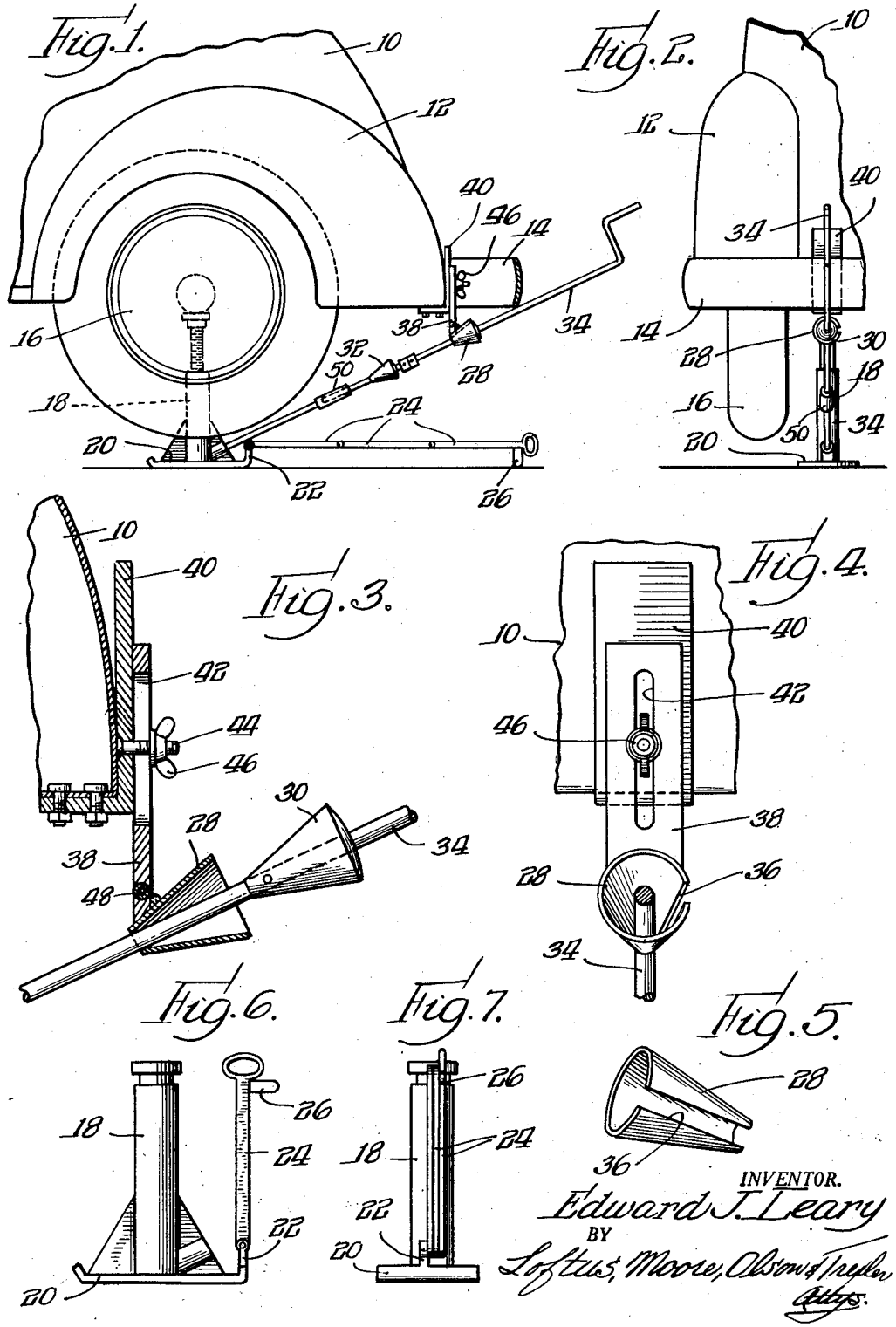

2,553,196

UNITED STATES PATENT OFFICE 2,553,196

JACK POSITIONING DEVICE

Edward J. Leary, San Francisco, Calif.

Application April 21, 1945, Serial No. 589,555

12 Claims. (Cl. 254—1)

This invention relates to jack positioning devices and it has for its object the provision of an improved arrangement of devices for properly positioning a jack underneath an automobile so as to have the desired effective engagement with an appropriate portion of the framework of the car.

In many cases where it is necessary that a jack be used for lifting an automobile for changing a tire or a wheel or for the application of chains to the wheels, it is important that the operation be carried out at the closest spot available near that at which the need develops without any more movement of the car than is necessary. Under such circumstances, the irregularities of the ground very often make it difficult to determine by inspection where the jack should be placed and it may also be difficult to manipulate the jack to the necessary extent for insuring the proper positioning of the supporting member of the jack underneath the framework of the automobile. These difficulties are increased substantially by the inaccessibility of the supporting framework of the car even for inspection underneath the car.

For accomplishing my object, I have provided an improved form of means for supporting a jack and for moving it along the ground into position under a car body, together with improved means for indicating the position to which the jack should be moved. This improved construction comprises preferably a jack having a platform or base member upon which the lifting mechanism is mounted, an extension connected with the base for shifting the base as required along the surface of the ground, and means on the operating handle of the jack cooperating with vertically adjustable means on a car body for indicating the normal position of the platform and jack under the car.

It is another object of the invention to improve devices of this type in sundry details hereinafter pointed out. The preferred means by which the several objects have been attained are illustrated in the accompanying drawing, in which Fig. 1 is a side view of the rear end portion of an automobile with the near rear wheel supported in spaced relation to the ground by my improved device, certain of the parts being shown in section.

Fig. 2 is a rear face view of the parts as shown in Fig. 1.

Fig. 3 is an enlarged detail view showing the arrangement of the interlocking means forming a part of my device.

Fig. 4 is a rear face view of the parts shown in Fig. 3.

Fig. 5 is a perspective view of one of the hollow cone members forming a part of the device.

Fig. 6 is a side face view of jack and the means for controlling its position; and Fig. 7 is a view of parts as seen from the right in Fig. 6.

Referring now to the several figures of the drawing, in which corresponding parts are indicated by the same reference characters, 10 indicates an automobile body having a fender 12 thereon, with a bumper 14 of any approved form secured at the rear end of the car. A supporting wheel 16 is shown underneath the fender 12 as usual.

In Figs. 1 and 2, the car body is shown as being supported in elevated position by means of a jack 18 so as to hold the wheel 16 in spaced relation to the ground, the jack being in engagement with the axle or some other suitable portion of the structure for lifting the body and the wheel 16. The jack 18 is fixedly mounted upon a plate 20 which serves as a base for the jack, the base 20 having an upstanding lug 22 at one side to which an articulated handle 24 is pivotally connected. In the arrangement shown the handle 24 is formed of three parts pivotally connected together in series, with the end part pivotally connected at the upper end of the lug 22. The outer end of the handle is supported by a short leg 26 so as to prevent the handle from being brought into engagement with the ground. The arrangement is such that with the handle extended as shown in Fig. 1 an operator is enabled very readily to pull or push the base 20 and the jack 18 thereon into any desired position along the ground for placing the jack in its operative position with respect to the car. When the handle 24 is not in use, it is preferably folded up into compact relationship with respect to the jack, as shown in Figs. 6 and 7.

For indicating the proper position for the jack underneath the car for operative engagement with an appropriate portion of the car for lifting it, I have provided improved means comprising four hollow cone members 28 secured in position on the car body at the four corners of the car, that is to say, one at each side at the rear and one at each side at the front. For cooperation with the hollow cones 28, I have provided conical members 30 and 32 on the handle 34 of the jack, cone members 30 being in position on the jack for engagement with the hollow cones 28 at the rear and the cone members 32 being in position on the handle for engagement with the hollow cone members 28 at the front of the car. At its inner face, each of the hollow cone members 28 is provided with a longitudinal slot 36 through which the handle 34 of the jack is adapted to pass for placing one of the cone members 30 or 32 into position for movement longitudinally of the handle into engagement with the hollow cone member. The arrangement is such that when the cone member 30 or 32 is brought into engagement with the hollow cone member on the car body the jack is at the proper distance from such hollow cone member and that when the two cone members are brought into alignment as shown by their snug engagement the jack is in proper position transversely of the car body for bringing the lifting member of the jack into engagement with the framework or other portion for a lifting operation.

In the preferred arrangement, I have mounted the hollow cone members 28 so as to be adjustable vertically with respect to the car body so as to have the desired aligned engagement with the cone members on the jack handle. For accomplishing this purpose, I have mounted the cone members 28 on the lower ends of plates 38 which are adjustable vertically with respect to mounting brackets 40 on the car body. The adjustment of the plates 38 is effected preferably by the use of slots 42 in the plates 38 through which pass bolts 44 carried by the brackets 40, wing nuts 46 being provided on the bolts for tightening the plates 38 effectively in adjusted position. The plates 38 and the cone members 28 are ordinarily moved upwardly to the limit of their motion when not in use, and are adjusted downwardly to the required position when the jack is to be used.

Since the angle between the handle 34 and the ground will vary as the jack 18 lifts the vehicle, there is provided a pivoted connection 48 for the cone 28 to accommodate this change. The elevation of the vehicle also increases the distance between the cone 28 and the bottom of the jack 20. To accommodate this change in distance the handle 34 is provided with a telescopic section 50 which may be of any desired construction preferably including spring means normally biasing the two handle portions toward the telescopic position so as to properly position the cones on the handle relative to the cone on the vehicle. Subsequently the elongation of the distance between the cone 28 and the jack will be accommodated by compression of the spring within the telescopic connection 50.

By the use of my improved arrangement, I am enabled under any circumstances to apply a jack in proper position for raising and supporting a corner of a car under any conditions likely to be met. By the use of the indicating means, the proper positioning of the jack both longitudinally and transversely of the car can be assured even when conditions are such as to prevent any adequate inspection. The arrangement is such also that the jack and its associated parts can be folded into compact form so as to take up very little room in the trunk or tool box of a car.

While the form of device as shown and described is preferred, the invention is not to be limited to such form and construction, except so far as the claims may be so limited, it being understood that changes might well be made in the construction and arrangement without departing from the spirit of the invention.

What is claimed is:

1. A jack positioning mechanism for use with a vehicle jack having a handle and a base, said mechanism comprising extension means connected with said base and extending horizontally therefrom for suitably positioning the jack, a conical member mounted on said handle, and a hollow conical member adapted to be mounted on a vehicle in position to have interengagement with said first named conical member for suitably positioning the jack in operative position with respect to the vehicle.

2. A jack positioning device for use with a vehicle jack having an actuating handle and a base, said device comprising a positioning handle connected to said jack and extending substantially horizontally therefrom for suitably positioning the jack, a hollow member adapted to be mounted on a vehicle, and a second member mounted on one of the said handles and adapted to have cooperative engagement with said hollow member by movement longitudinally of the handle thereinto for suitably positioning the jack in operative position with respect to the vehicle, said hollow member having an opening at one side thereof through which the handle carrying the said second member is adapted to pass for bringing said second member into position for engagement therewith.

3. A jack positioning device for use with a vehicle jack having a handle and a base, said device comprising extension means connected with said base and extending horizontally therefrom for suitably positioning the jack under the vehicle, a conical member mounted on the handle of the jack, and a hollow conical member adapted to be mounted on a vehicle in position to receive said first named conical member squarely therein for securing proper positioning of the jack in operative position with respect to the vehicle, said hollow conical member having a slot open at one side face of a size to permit passage of the handle transversely therethrough for movement of the conical members axially into engagement but to prevent disengagement of the conical members transversely from each other when interengaged.

4. A jack positioning mechanism for use with a vehicle jack having an actuating handle and a base, said mechanism comprising a positioning handle connected with said jack and extending substantially laterally thereof for suitably positioning the jack, a member mounted on one of said handles, a cooperative member adapted to have releasable engagement with said first named member, and means for adjustably mounting said cooperative member on a vehicle so that said two members may by their engagement indicate the proper positioning of the jack in operative position with respect to the vehicle.

5. A jack positioning mechanism for use with a vehicle jack having a handle and base, said mechanism comprising extension means connected with said base and extending horizontally therefrom for suitably positioning the jack, a conical member mounted on the handle of the jack, a cooperating hollow conical member adapted to have releasable engagement with said first named conical member, and means for adjustably mounting said hollow conical member on a vehicle so as to be movable vertically with respect thereto, so that said two members may by their interengagement indicate the proper positioning of the jack in operative position with respect to the vehicle.

6. A jack positioning mechanism for use with a vehicle jack having a handle, a base, and lifting mechanism, said jack positioning mechanism comprising articulated handle means comprising a plurality of pivotally connected links pivotally connected with said base at a point substantially above the bottom face thereof for suitably positioning the jack and adapted to be collapsed into compact relation to the lifting mechanism of said jack, and two interfitting members one of which is mounted on said handle and the other of which is adapted to be mounted on a vehicle, said members being adapted when so mounted and interengaged to indicate the proper positioning of the jack in operative position with respect to the vehicle.

7. A jack positioning mechanism for use with a vehicle jack having a handle, a base, and lifting mechanism, said jack positioning mechanism comprising articulated handle means including a plurality of pivotally connected links pivotally connected with said base at a point substantially above the bottom face thereof for suitably positioning the jack and adapted to be collapsed into compact relation to said lifting mechanism, means carried by the end link for supporting said handle means in spaced relation to the ground, and two interfitting members one of which is mounted on said handle, the other of which is adapted to be mounted on a vehicle, said members when so mounted and interengaged to indicate the proper positioning of the jack in operative position with respect to the vehicle.

8. A jack positioning mechanism for use with a vehicle jack having a handle and a base, said mechanism comprising extension means connected with said base and extending horizontally therefrom for suitably positioning the jack, hollow conical members adapted to be mounted on a vehicle at one side thereof in predetermined selected positions with respect to jack accommodating portions on the framework of the vehicle to be engaged for raising the vehicle to elevated position, and a plurality of conical members mounted on said handle in spaced relation to each other therealong for engagement with said hollow conical members respectively, one of said conical members on the handle and the corresponding conical member on the vehicle being adapted when interengaged to indicate the proper positioning of the jack in operative position with respect to the vehicle.

9. A jack positioning mechanism for use with a vehicle and a vehicle jack having a handle and a base, said mechanism comprising extension means connected with said base and extending horizontally therefrom for suitably positioning the jack, two hollow conical members mounted on the vehicle at the rear end of the vehicle at opposite sides thereof in predetermined selected positions with respect to jack accommodating portions on the framework of the vehicle at its rear end portion, two other hollow conical members mounted on the vehicle at the front end thereof at opposite sides of the vehicle in predetermined selected positions with respect to jack accommodating portions on the framework of the vehicle at its front end portion, and a plurality of conical members mounted on the handle of said jack in spaced relationship to each other therealong for engagement with said hollow conical members respectively, one of said conical members on the handle and the corresponding hollow conical member on the vehicle being adapted when interengaged squarely with each other to indicate the proper positioning of the jack in operative position with respect to the vehicle for a lifting operation.

10. A jack positioning mechanism for use with a vehicle and a vehicle jack having a handle and a base, said mechanism comprising extension means connected with said base and extending horizontally therefrom for suitably positioning the jack relative to said vehicle, two hollow conical members mounted so as to be adjustable vertically on the vehicle at the rear end of the vehicle at opposite sides thereof in predetermined selected positions with respect to jack accommodating portions on the framework of the vehicle at its rear end portion, two other conical members mounted so as to be adjustable vertically on the vehicle at the front end thereof at opposite sides of the vehicle in predetermined selected positions with respect to jack accommodating portions on the framework of the vehicle at its front end portion, said hollow conical members at the front of the vehicle being positioned at a shorter distance from the bearings to be engaged by the jack than the distance at which the hollow conical members are positioned from the bearings at the rear end of the vehicle, and a plurality of conical members mounted on the handle of said jack in spaced relationship to each other therealong for engagement with said hollow conical members, one of said conical members on the handle and the corresponding hollow conical member on the vehicle being adapted when interengaged squarely with each other to indicate the proper positioning of the jack in operative position with respect to the vehicle for a lifting operation.

11. A jack positioning mechanism for use with a vehicle jack having an actuating handle and a base, said mechanism comprising a positioning handle connected with said jack and extending substantially laterally thereof for suitably positioning the jack, and two interfitting members, one member being mounted on one of said handles and the other member being adapted to be mounted on a vehicle and when so mounted and engaged with the first member to indicate the proper positioning of the jack in operative position with respect to the vehicle.

12. A jack positioning mechanism for a lifting jack with its base and handle, said mechanism comprising articulated handle means including a plurality of pivotally connected links connected with said base and extending horizontally therefrom for suitably positioning the jack, and two conical members, one member being mounted on said handle and the other member being adapted to be mounted on a vehicle, said members serving to indicate by their interengagement the proper positioning of the jack in operative position with respect to the vehicle.

EDWARD J. LEARY.

REFERENCES CITED

The following references are of record in the file of this patent:

UNITED STATES PATENTS

| Number | Name | Date |
| --- | --- | --- |
| 1,518,627 | Wills | Dec. 9, 1924 |
| 1,903,341 | Mitchell | Apr. 4, 1933 |
| 2,033,808 | Banks | Mar. 10, 1936 |